UNITED STATES PATENT OFFICE.

JOHN A. JUST, OF SYRACUSE, NEW YORK.

PROCESS OF OBTAINING MILK-SUGAR.

No. 868,443.   Specification of Letters Patent.   Patented Oct. 15, 1907.

Application filed November 21, 1906. Serial No. 344,353.

*To all whom it may concern:*

Be it known that I, JOHN A. JUST, a citizen of the United States, and a resident of Syracuse, New York, have invented certain new and useful Improvements in Processes of Obtaining Milk-Sugar, of which the following is a specification.

This invention relates to a process of obtaining milk sugar from whey and other crude milk sugar solutions, and in order to carry out the process in the best manner the following mode of procedure should be substantially followed.

Mix the whey or crude milk sugar solution with infusorial earth (silica), talc, asbestos or other similar mineral absorbent to form a magma and quickly dry the mixture on a hot surface so constructed as to make a continuous operation, as for instance, a revolving cylinder suitably heated to expel the water from the mixture, but not heated sufficiently to decompose the product (milk sugar). Sufficient earth is added to bring the mass to a consistency which will pass over the heated surface in a film. The film may be more or less thick as desired, and the consistency of the mixture may be that of a creamy paste. The albumen will be coagulated by this treatment, the fat absorbed by the mineral matter and the sugar will be dried quickly. On leaching the dry shavings like product a clear and nearly pure milk sugar solution is obtained at once, because the albumen and the fat which have been absorbed by the earth are held back by it and will be insoluble in the water. The solution of sugar requires but little further attention to purify it and it finally crystallizes as pure milk sugar from a suitably concentrated solution. The solution so formed of the milk sugar may also be precipitated with alcohol or purified by any known method. Alcohol if used may be recovered for re-use. The inert mineral matter is also recovered for re-use by calcining and burning out the organic matter or used for refining impure sugar solution since it acts like animal charcoal on such solutions.

Milk sugar compounds of potassium, sodium, or similar alkaline bases may be formed in the solution, the salt thus formed leached and the solution precipitated with $CO_2$, which decomposes the compound and the milk sugar precipitated by alcohol. This removes the albumen and fat completely.

The described methods give a milk sugar free from fat and albumen and therefore of excellent keeping quality. Fat and albumen when present in milk sugar as impurities are detrimental to its keeping qualities, such impure milk sugar changing on storage or when mixed with starchy substances, and acquiring an unpleasant odor.

Since the film is porous in its nature, due to the mixture with mineral material, moisture may be expelled much more quickly without decomposing the milk sugar.

By saying that the treatment will coagulate the albumen, I mean that the heat and drying coagulates the albumen, which is taken up by the mineral matter and held back during the subsequent solution of the milk sugar.

I claim and desire to obtain by Letters Patent the following:—

1. In the manufacture of milk sugar preparations, the process which comprises mixing a crude milk sugar solution with a mineral absorbent to form a magma, drying the magma to expel water and render impurities insoluble, and leaching the dried material to form a purer milk sugar solution.

2. The process of preparing pure milk sugar which consists in mixing a crude milk sugar solution with a mineral absorbent to form a magma, drying the magma to expel water and render impurities insoluble, leaching the dried material to form a purer milk sugar solution and recovering the milk sugar from this solution.

3. The process of preparing pure milk sugar which consists in mixing a crude milk sugar solution with a mineral absorbent to form a magma, drying the magma to expel water and render impurities insoluble, leaching the dried material to form a purer milk sugar solution and recovering the milk sugar from this solution by concentration and crystallization.

4. The process of preparing pure milk sugar which consists in mixing a crude milk sugar solution with infusorial earth to form a magma, quickly drying this magma to expel water and render impurities insoluble, leaching the dried material to form a purer milk sugar solution and recovering the milk sugar from this solution.

5. The process of preparing pure milk sugar which consists in mixing a crude milk sugar solution with a mineral absorbent to form a magma, converting this magma into a film and quickly drying to expel water and render impurities insoluble, leaching the dried material to form a purer milk sugar solution and recovering the milk sugar from this solution.

In testimony whereof I have signed this specification in the presence of two subscribing witnesses.

JOHN A. JUST.

Witnesses:
OLIN A. FOSTER,
A. K. SCHNEIDER.